US008498087B2

(12) United States Patent
Rabu et al.

(10) Patent No.: US 8,498,087 B2
(45) Date of Patent: Jul. 30, 2013

(54) THERMAL PROTECTION CIRCUITS FOR ELECTRONIC DEVICE CABLES

(75) Inventors: Stanley Rabu, Sunnyvale, CA (US); James M. Hollabaugh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 891 days.

(21) Appl. No.: 12/611,900

(22) Filed: Nov. 3, 2009

(65) Prior Publication Data

US 2011/0104940 A1 May 5, 2011

(51) Int. Cl.
*H02H 5/04* (2006.01)

(52) U.S. Cl.
USPC .......... 361/104

(58) Field of Classification Search
USPC .......... 361/104
See application file for complete search history.

(56) References Cited

U.S. PATENT DOCUMENTS

| | | | | |
|---|---|---|---|---|
| 3,150,311 | A * | 9/1964 | Jones et al. | 340/587 |
| 5,545,494 | A | 8/1996 | Trumble et al. | |
| 5,768,894 | A | 6/1998 | Li et al. | |
| 6,176,717 | B1 * | 1/2001 | Campolo et al. | 439/181 |
| 6,178,514 | B1 * | 1/2001 | Wood | 713/300 |
| 6,584,280 | B1 * | 6/2003 | Wang | 392/498 |
| 6,762,563 | B2 * | 7/2004 | St-Germain et al. | 315/129 |
| 7,189,108 | B2 | 3/2007 | Takaya et al. | |
| 7,258,580 | B1 * | 8/2007 | Ho et al. | 439/668 |
| 7,307,293 | B2 | 12/2007 | Fjelstad et al. | |
| 7,544,082 | B1 * | 6/2009 | Halvorsen | 439/367 |
| 7,561,388 | B2 * | 7/2009 | Sung et al. | 361/42 |
| 7,766,692 | B2 * | 8/2010 | Johnsen et al. | 439/488 |
| 2005/0205281 | A1 | 9/2005 | Bachinski et al. | |
| 2005/0255724 | A1 | 11/2005 | Picco et al. | |
| 2006/0036380 | A1 * | 2/2006 | Lee et al. | 702/60 |
| 2006/0279885 | A1 * | 12/2006 | Sung et al. | 361/42 |
| 2007/0139842 | A1 | 6/2007 | De Longhi | |
| 2009/0108416 | A1 | 4/2009 | Fjelstad et al. | |
| 2009/0167494 | A1 * | 7/2009 | Martins | 340/10.1 |
| 2009/0316321 | A1 * | 12/2009 | Ouwerkerk | 361/106 |
| 2010/0194582 | A1 * | 8/2010 | Petite | 340/825.52 |
| 2010/0318306 | A1 * | 12/2010 | Tierney et al. | 702/62 |
| 2012/0157009 | A1 * | 6/2012 | Hollander et al. | 455/73 |

FOREIGN PATENT DOCUMENTS

| | | | |
|---|---|---|---|
| EP | 2117095 | A1 * | 11/2009 |
| JP | 403111775 | | 5/1991 |
| WO | 2009/019801 | | 2/2009 |

OTHER PUBLICATIONS

Rabu et al., U.S. Appl. No. 12/485,019, filed Jun. 15, 2009.

* cited by examiner

*Primary Examiner* — Ronald W Leja
(74) *Attorney, Agent, or Firm* — Womble Carlyle Sandridge & Rice LLP

(57) ABSTRACT

Connectors for cables such as a 30-pin connector are provided. The connectors may have thermal protection circuits and may carry a power supply voltage and a ground voltage. The thermal protection circuits may disable the power supply voltage when the temperature of the connector exceeds a threshold value. The thermal protection circuits may disable the power supply voltage when liquid is detected in the connector. The thermal protection circuits may disable the power supply voltage permanently or temporarily. In one example, when a cable is reset, the thermal protection circuits may use a record of previous fault events and measurements from thermal and liquid sensors to determine whether to enable or disable the power supply voltage.

20 Claims, 16 Drawing Sheets

THERMAL PROTECTION CIRCUITS FOR ELECTRONIC DEVICE CABLES

BACKGROUND

This invention relates to thermal protection circuits and structures for electronic device cables.

Portable electronic devices such as portable computers, handheld media players, and cellular telephones typically contain connectors that receive power signals from other electronic devices such as desktop computers and power adapters. The power signals are typically conveyed over cables such as Universal Serial Bus (USB) cables. A user who desires to use a portable electronic device or who desires to charge a battery in the portable electronic device may connect the device to a source of electricity such as a power adapter using a cable.

Conventional cables and connectors for cables and electronic devices can fail in the presence of moisture. In particular, when the cables or connectors become wet from misuse, conductive dendritic structures can form in the dielectric material being used to isolate conductive structures that are at different potentials in the cables or conductors. Once a conductive dendritic structure forms in the dielectric material between the conductors, the two conductors are effectively shorted together. This short circuit condition can lead to excessive current and an undesirable buildup of heat. In some situations, the heat that is produced may melt part of the cable or connector and cause a failure.

It would therefore be desirable to be able to provide thermal protection circuits and structures for electronic device cables.

SUMMARY

Cables for electronic devices may include thermal protection circuits. The electronic devices may be desktop computers, portable computers, handheld devices, power adapters, or other suitable electronic devices. The cables may interconnect the electronic devices. The thermal protection circuits may include temperature-sensitive devices such as temperature sensors and moisture-sensitive devices such as moisture sensors. Power cutoff switches in the thermal protection circuitry may be used to prevent excessive currents from developing.

With one suitable arrangement, a cable may include thermal protection circuitry such as a temperature sensor, a moisture sensor, and a power cutoff switch. The cable may include two connectors connected together by a plurality of conductors. As an example, the moisture sensor may be formed from a pair of exposed conductors in one of the connectors. In this example, the moisture sensor may detect the presence of moisture in the connector by detecting a moisture-related short between the two exposed conductors. The two exposed conductors may be placed at strategic locations in the connector at which water intrusion is likely. The two exposed conductors may surround circuitry in the connector so that any moisture intrusion into the circuitry can be detected.

If desired, the temperature and moisture sensors and the power cutoff switch may be located in a single connector. With this type of arrangement, the power cutoff switch may be configured to cut off power to a portion of the connector when the temperature of the connector exceeds a threshold value or when moisture is detected in the connector.

With another arrangement, the temperature sensor and the moisture sensor may be located in a first connector and the power cutoff switch may be located in a second connector. In this configuration, the power cutoff switch may cut off power to the first connector when the temperature sensor determines that the temperature of the first connector has exceeded a threshold temperature or when the moisture sensor detects moisture in the first connector.

Further features of the invention, its nature and various advantages will be more apparent from the accompanying drawings and the following detailed description of the preferred embodiments.

DETAILED DESCRIPTION

Figure 1:
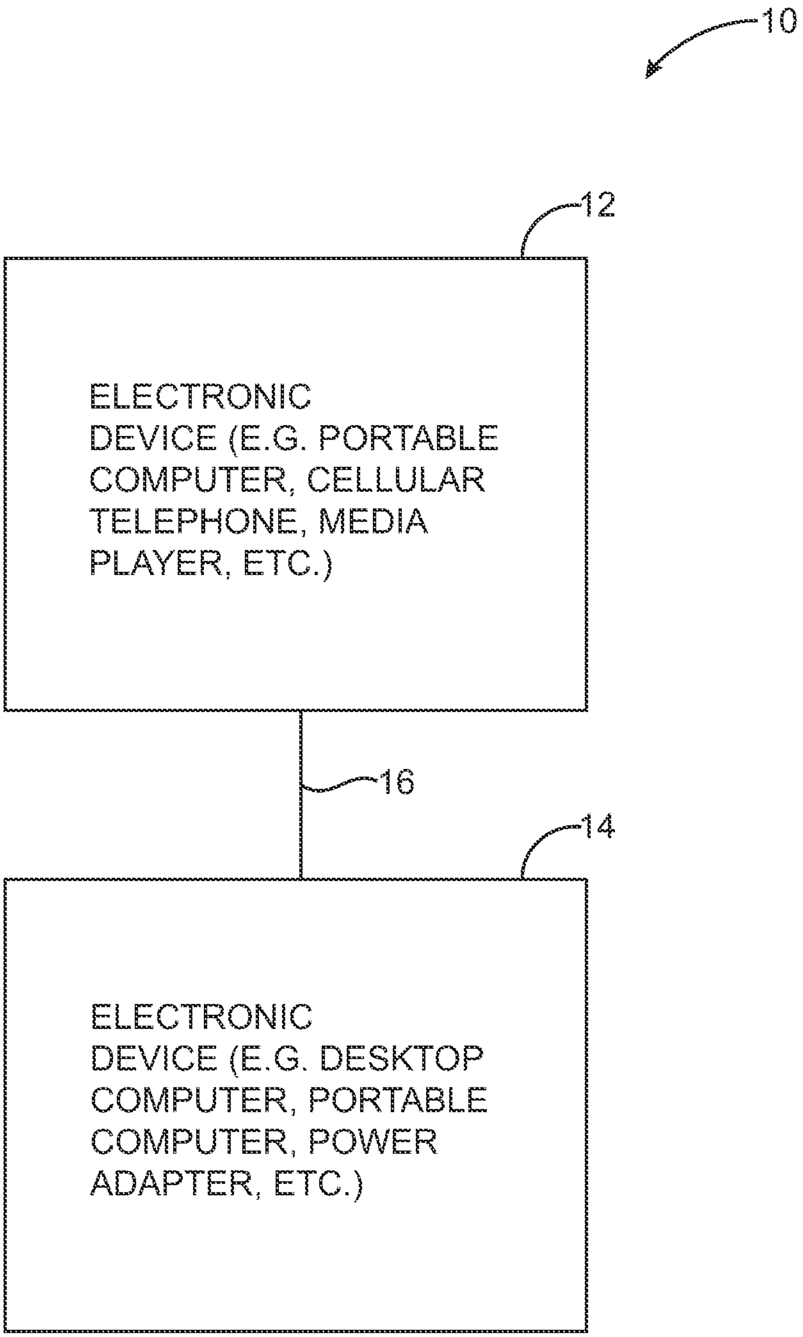
FIG. 1 is a schematic diagram of illustrative electronic devices that may communicate over a communications path that includes thermal protection circuits in accordance with an embodiment of the present invention.

Electronic components such as electronic devices and other equipment may be interconnected using wired paths. As an example, a cable may include conductors that convey power signals and data signals between two interconnected electronic devices. A cable may, for example, convey power between a power adapter and a portable electronic device. The cable may include connectors at one or both of its ends. These cable connectors may plug into mating connectors. For example, a cable connector at one end of a cable may plug into a connector in a power adapter and a cable connector at the other end of the cable may plug into a connector in an electronic device. The conductors in the cable couple the connectors at either end of the cable to each other. Pins (or other suitable contacts) may be provided in each connector that mate with corresponding pins in the equipment that mates with the connectors. For example, a cable may have a 30-pin connector. Pins in the 30-pin connector receive power from the conductors in the cable and deliver power to corresponding pins in a media player, cellular telephone, or other electronic device.

Cables and their connectors are sometimes inadvertently exposed to moisture. In these circumstances, shorts can form that can lead to excessive temperatures and equipment damage. In a typical failure scenario, a user may spill a liquid onto a connector. When moisture infiltrates the connector, the moisture can interact with the conductive portions of the connector, leading to dendrite growth and short circuits. Initially, dendrites may be too weak to sustain large currents. However, dendrites will eventually grow sufficiently to form a high-current path between the conductive portions of the connector (i.e., conductors at different potentials). The current that flows along the high-current path will sometimes be sufficient to burn plastic housing structures in the connector. Burnt plastic may then lead to conductive carbon deposits that contribute to the undesired short circuit condition. At this point, the connector may be permanently damaged and, if the generated current and heat was sufficient, the device into which the cable connector was plugged could also be damaged.

If desired, cables may be provided with thermal protection circuits and structures that help limit the damage caused by electrical shorts (e.g., damage from moisture-induced dendrite growth and resulting short circuits). Electronic devices may also be provided with thermal protection circuits and structures.

For example, a cable may include thermal protection circuitry that reduces or eliminates power supply signals flowing to a connector in the cable when it is determined that the temperature of the connector has risen above a given threshold. The given threshold may be relatively high, so that any moisture in the connector is removed by heating (i.e., the connector is dried) before the power supply signals are deactivated. Because the connector may be fully dried out by the heating process, the connector will not contain residual pockets of moisture that might result in additional dendrite formation and additional short circuits.

With one suitable arrangement, cables may include thermal protection structures in connectors that encourage moisture-related shorts (e.g., shorts resulting from dendritic growths) to occur in one or more specific locations in the connectors. With this type of arrangement, the cables may include one or more switches that can cut off power supply signals in those specific locations.

If desired, cables may include liquid detection circuits that detect liquid intrusion. With one suitable arrangement, a liquid detection circuit in a connector may be connected to a control circuit in the connector that disables power supply signals when liquid is detected. As one example, the liquid detection circuit may be implemented using exposed parallel conductive lines or wires, which are shorted together by liquid when liquid enters the connector. In general, the exposed conductive lines may be run through any suitable portion of the connector (e.g., portions of the connector in which liquid intrusion is more likely to occur).

An illustrative system in accordance with an embodiment of the present invention is shown in FIG. 1. As shown in FIG. 1, system 10 may include a first electronic device such as electronic device 12 and a second electronic device such as electronic device 14. A wired path such as path 16 may be used to connect electronic device 12 to electronic device 14. In a typical arrangement, path 16 includes one or more conductive lines and a connector at each end. The conductive lines in path 16 may be used to convey signals such as data and power signals over path 16. There may, in general, be any suitable number of lines in path 16. For example, there may be two, three, four, five, six, or more than six separate lines. These lines may be part of one or more cables. Cables may include solid wire, stranded wire, shielding, single ground structures, multi-ground structures, twisted pair structures, or any other suitable cabling structures. Extension cord and adapter arrangements may be used as part of path 16, if desired. Path 16 may be a cable and path 16 may sometimes be referred to herein as cable 16.

Electronic device 12 may be a desktop or portable computer, a portable electronic device such as a cellular telephone or other handheld electronic device that has wireless capabilities, equipment such as a television or audio receiver, a handheld media player, or any other suitable electronic equipment. Electronic device 12 may be provided in the form of stand-alone equipment (e.g., a handheld device that is carried in the pocket of a user) or may be provided as an embedded system.

Electronic device 14 may be any suitable device that works in conjunction with electronic device 12. Examples of electronic device 14 include a portable electronic device, a cellular telephone or other handheld electronic device that has wireless capabilities, equipment such as a television or audio receiver, a handheld media player, or any other suitable electronic equipment. With one suitable arrangement, electronic device 14 may be a power adapter such as a power adapter that converts household power (e.g., alternating-current signals at a nominal voltage of approximately 120 volts or at a nominal voltage of approximately 230 volts, depending on location) or that converts power from an automobile (e.g., direct-current signals at a nominal voltage of approximately 12 volts) to power suitable for use by electronic device 12 (e.g., direct-current power signals at ground and five volts). With this type of arrangement, electronic device 12 may be a portable electronic device such as a portable computer, a cellular telephone, or a media player that receives power from the power adapter 14.

Figure 2:
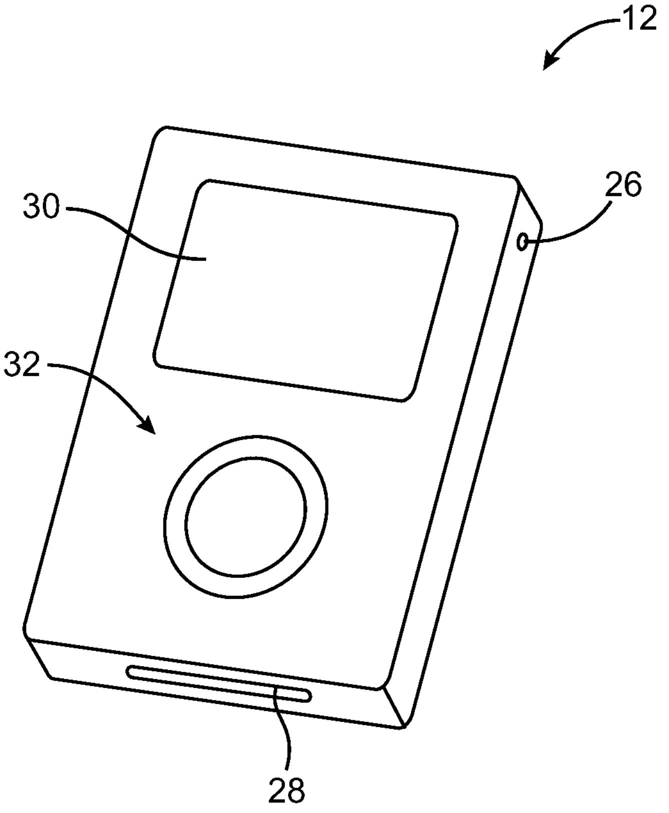
FIG. 2 is a perspective view of an illustrative electronic device such as a media player, cellular telephone, or hybrid device showing how the electronic device may have a connector that mates with other electronic devices and accessories in accordance with an embodiment of the present invention.

An illustrative example of electronic device 12 is shown in FIG. 2. In the example of FIG. 2, device 12 is shown as having a screen such as screen 30 and a user input device such as user interface device 32. Device 32 may be, for example, a click wheel, a touch pad, keys, switches, or other suitable buttons, a touch screen, etc. Screen 30 may be, for example, a touch screen that covers a large fraction of the front face of device 12. Audio jack 26 may be provided to allow a user to connect a headset or other accessory to device 12. Device 12 may include connectors such as connector 28. Connector 28 may be a 30-pin connector, a Universal Serial Bus (USB) port, a connector that couples to a connector in path 16 of FIG. 1, etc.

Figure 3:
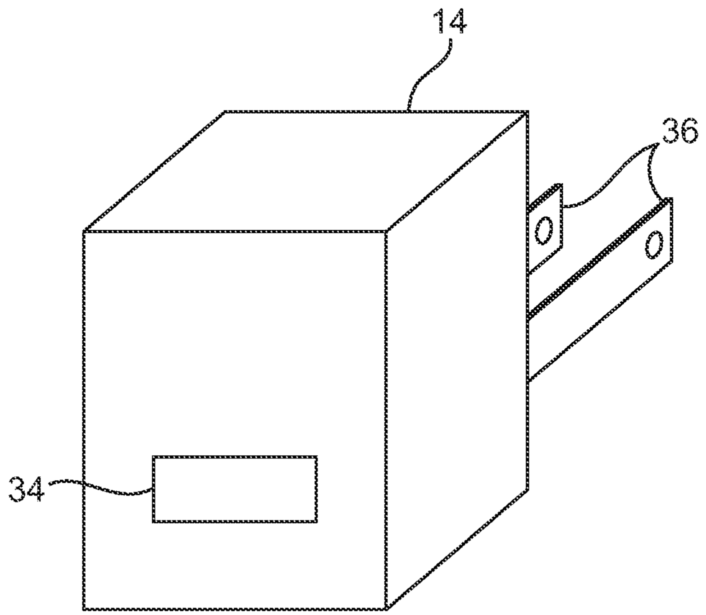
FIG. 3 is a perspective view of an illustrative electronic device such as a power adapter showing how the electronic device may have a connector that mates with other electronic devices and that conveys power signals to the other electronic devices in accordance with an embodiment of the present invention.
Figure 4:
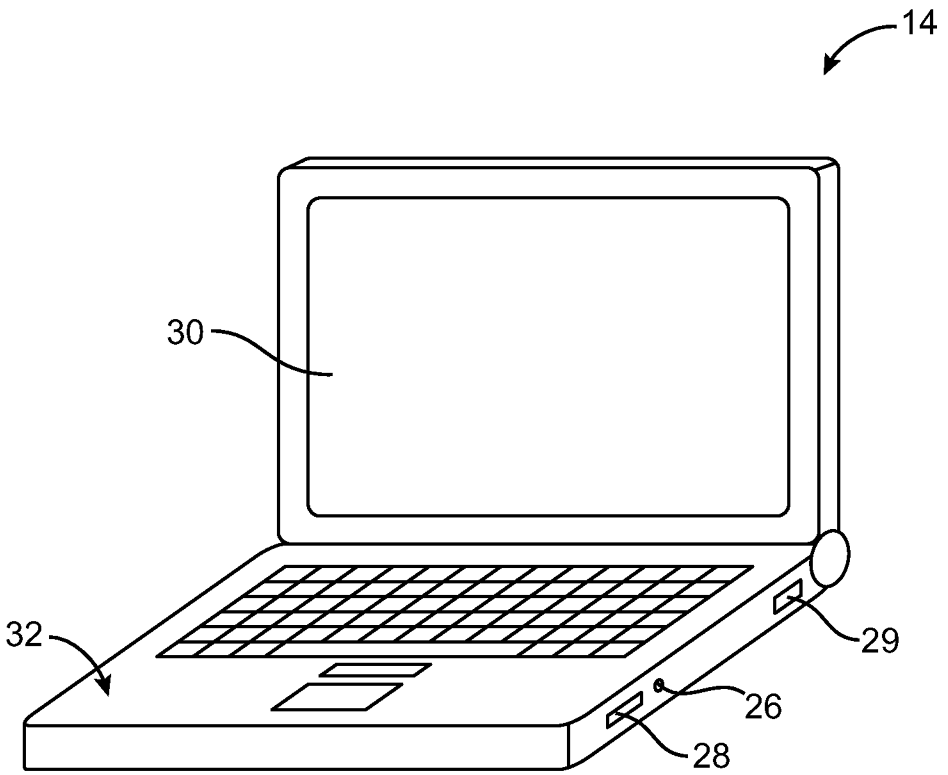
FIG. 4 is a perspective view of an illustrative electronic device such as a portable computer that may have one or more connectors that can mate with other electronic devices in accordance with an embodiment of the present invention.

Illustrative examples of electronic device 14 are shown in FIGS. 3 and 4. In the example of FIG. 3, device 14 is a power adapter that converts electricity into an appropriate form for use by another electronic device 12. With this type of arrangement, device 14 may include power connectors such as connectors 36 (prongs) that couple to an electricity outlet and a connector such as connector 34. Connector 34 may be a Universal Serial Bus (USB) port connector, a 30-pin connector, any other suitable connector. Connector 34 may mate with a connector in path 16 of FIG. 1 and may be used to convey power signals over path 16 from device 14 to device 12 (e.g., for powering device 12 and for charging a battery in device 12).

In the example of FIG. 4, device 14 is a portable computer. Portable computer 14 of FIG. 4 has a display such as display 30 and user input equipment such as touch pad and keys 32. As shown in FIG. 4, device 14 may have an audio jack such as jack 26 for receiving a mating audio plug. Device 14 may also have connectors such as connector 28 and connector 29. Connectors 28 and 29 may be 30-pin connectors, Universal Serial Bus (USB) ports, connectors that couple to one or more connectors in path 16 of FIG. 1, etc.

Figure 5:
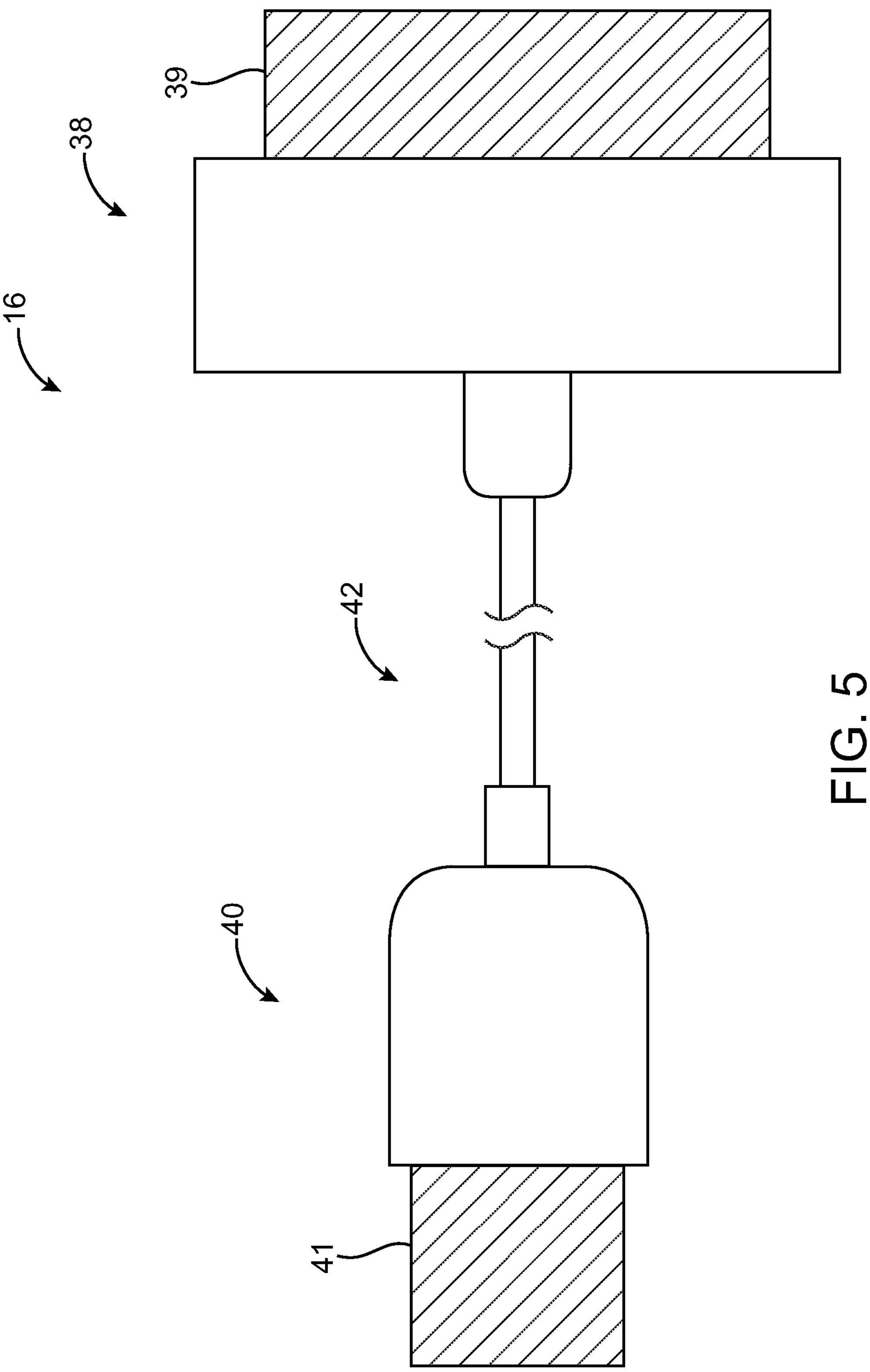
FIG. 5 is a top view of an illustrative cable that may form a communications path between two electronic devices and that may include thermal protection circuits and structures in accordance with an embodiment of the present invention.

An illustrative example of a cable that may form a communications path between electronic devices 12 and 14 is shown in FIG. 5. In the example of FIG. 5, cable 16 includes first connector 38, second connector 40, and communications path 42 between connectors 38 and 40. Connector 38 may be a 30-pin connector that mates with connector 28 (FIG. 2) of electronic device 12. If desired, connector 40 may be a Universal Serial Bus (USB) connector that can couple to a connector such as connector 29 (FIG. 4) of electronic device 14 and that can couple to connector 34 (FIG. 3) of power adapter 14. Communications path 42 may include any suitable number of conductive lines and may convey signals such as data and power signals between connectors 38 and 40. If desired, connector 38 may include a male connector portion such as portion 39 that is received by a female connector such as connector 28 (FIGS. 2 and 4) and connector 40 may include a male connector portion such as portion 41 that is received by a female connector such as connector 34 (FIG. 3) or connector 29 (FIG. 4). In general, cable 16 may be formed using any suitable combination of male and female connectors. If desired, one end of cable 16 may be integrated into an electronic device (e.g., a power adapter).

As described above, conventional cables and connectors for cables and electronic devices can fail in the presence of excessive moisture. In particular, when the cables or connectors become wet, conductive dendritic structures will form in dielectric material between adjacent conductive structures that are at different potentials in the cables or connectors. Once a conductive dendritic structure forms in the dielectric material between the two conductive structures, the two structures are effectively shorted together, thereby leading to a buildup of heat that may melt surrounding material.

Figure 6:
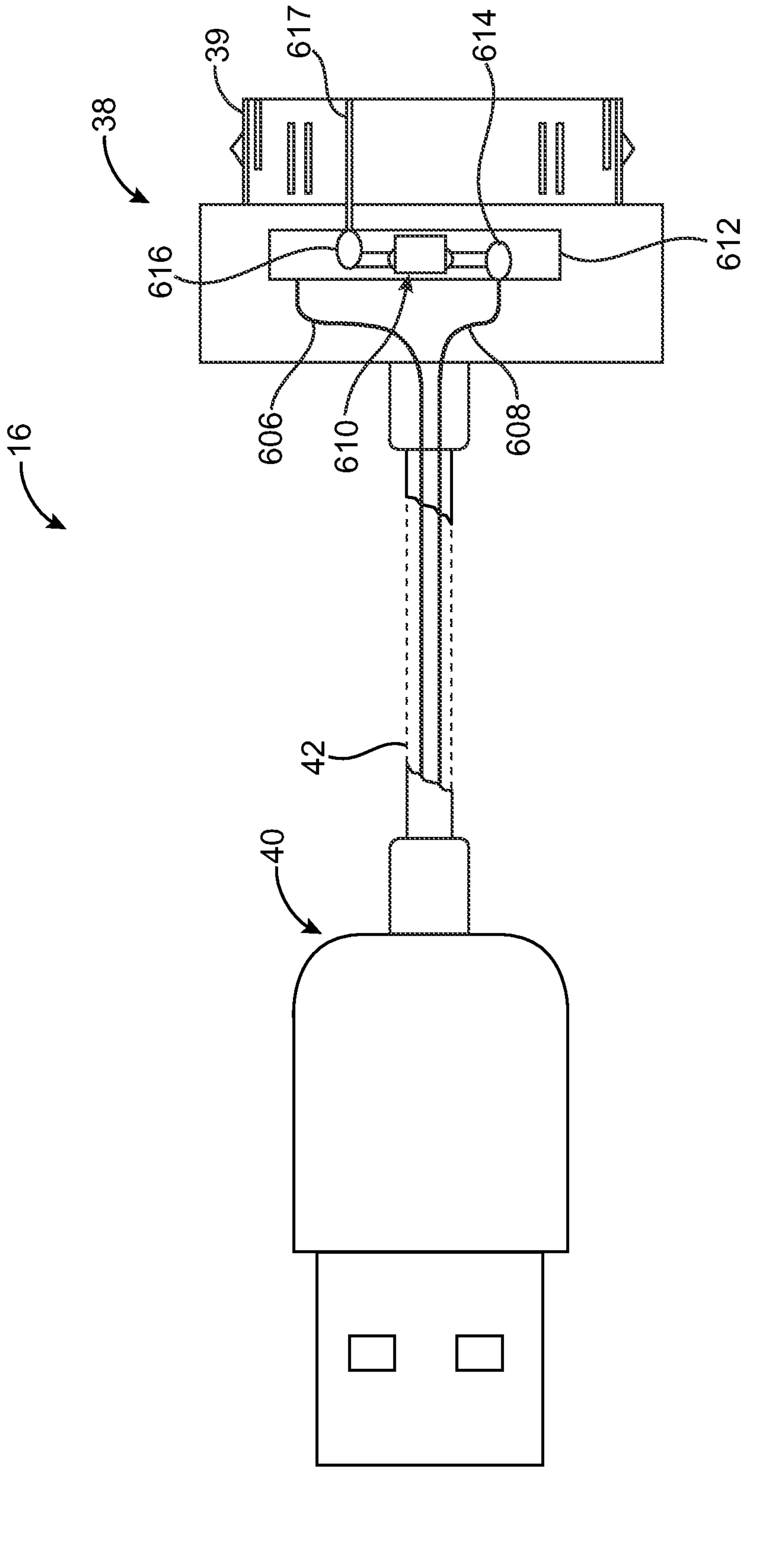
FIG. 6 is a top view of an illustrative cable that may include a connector that has thermal protection circuitry for deactivating power supply lines in the connector in response to rising temperatures in the connector in accordance with an embodiment of the present invention.

An example of a cable that may include a connector with thermal protection circuitry is shown in FIG. 6. As shown in FIG. 6, cable 16 may include connectors 38 and 40. With one suitable arrangement, connector 40 may be a male Universal Serial Bus (USB) connector that couples to a female Universal Serial Bus (USB) port such as connector 34 of FIG. 3 and connector 29 of FIG. 4. Connector 38 may be a 30-pin connector that couples to a 30-pin connector such as connector 28 of FIGS. 2 and 4.

With one arrangement, conductors such as conductors 606 and 608 in path 42 may convey signals between connectors 38 and 40. For example, conductors 606 and 608 may carry power supply signals between the two connectors of cable 16. As an example, conductor 606 may carry ground power supply signals and conductor 608 may carry positive power supply signals (e.g., signals at a potential of approximately 5.0 volts above ground). Conductor 606 may be a ground conductor and conductor 608 may be a power conductor. With this type of arrangement, there may be a potential difference in connector 38 between two conductive surfaces that can, under some circumstances, be susceptible to dendritic growth.

If desired, connector 38 may include thermal protection circuitry 610. As one example, thermal protection circuitry 610 may be mounted on printed circuit board 612 and, if desired, may be mounted between contacts 614 and 616. Contact 614 may be coupled to conductor 608 and contact 616 may be coupled to pin 617 (e.g., a male pin in connector 38 extending from connector 38). There may be a conductive trace between the two contacts 614 and 616. As one example, thermal protection circuitry 610 may be mounted along the conductive trace.

If desired, cable 16 may include structures that force moisture-related shorts (e.g., dendritic shorts) to form in a particular location. For example, connector 38 may include a structure that encourages moisture-related shorts in connector 38 to form near contact 616 so that circuit 610 can shut off power to any shorts that form in connector 38. With one suitable arrangement, circuit 610 may be configured to shut off power only after connector 38 has been heated enough to dry out any moisture in connector 38.

Thermal protection circuitry 610 may include a temperature-sensitive device such as a temperature sensor, a moisture-sensitive device such as a liquid detector, and a voltage (power) cutoff switch (as examples). With this type of arrangement, thermal protection circuitry 610 may be configured to detect increasing temperatures and/or the presence of moisture in connector 38 (which may be indicative of a short between conductors 606 and 608). In response to increasing temperatures and/or the presence of moisture in connector 38, circuitry 610 (e.g., a switch in circuitry 610) may be configured to cut off a power supply in connector 38 by electrically isolating contact 614 from contact 616. With this type of arrangement, the potential of contact 616 may be reduced towards ground. Assuming that the increasing temperatures were a result of a short in connector 38, circuitry 610 may be able to eliminate the cause of the increasing temperatures (e.g., by cutting off the voltage supply to contact 616). In general, thermal protection circuitry such as circuitry 610 may include any suitable devices (e.g., temperature-sensitive devices and moisture-sensitive devices) for determining when the power cutoff switch cuts off power to connector 38. For example, circuitry 610 may include a temperature-sensitive fuse or other suitable device that changes state depending on the temperature within connector 38. If desired, circuitry 610 may include a liquid detector that includes a pair of exposed wires that can be used to detect the presence of liquid (e.g., by detecting when the wires are shorted together by the liquid).

Figure 7:
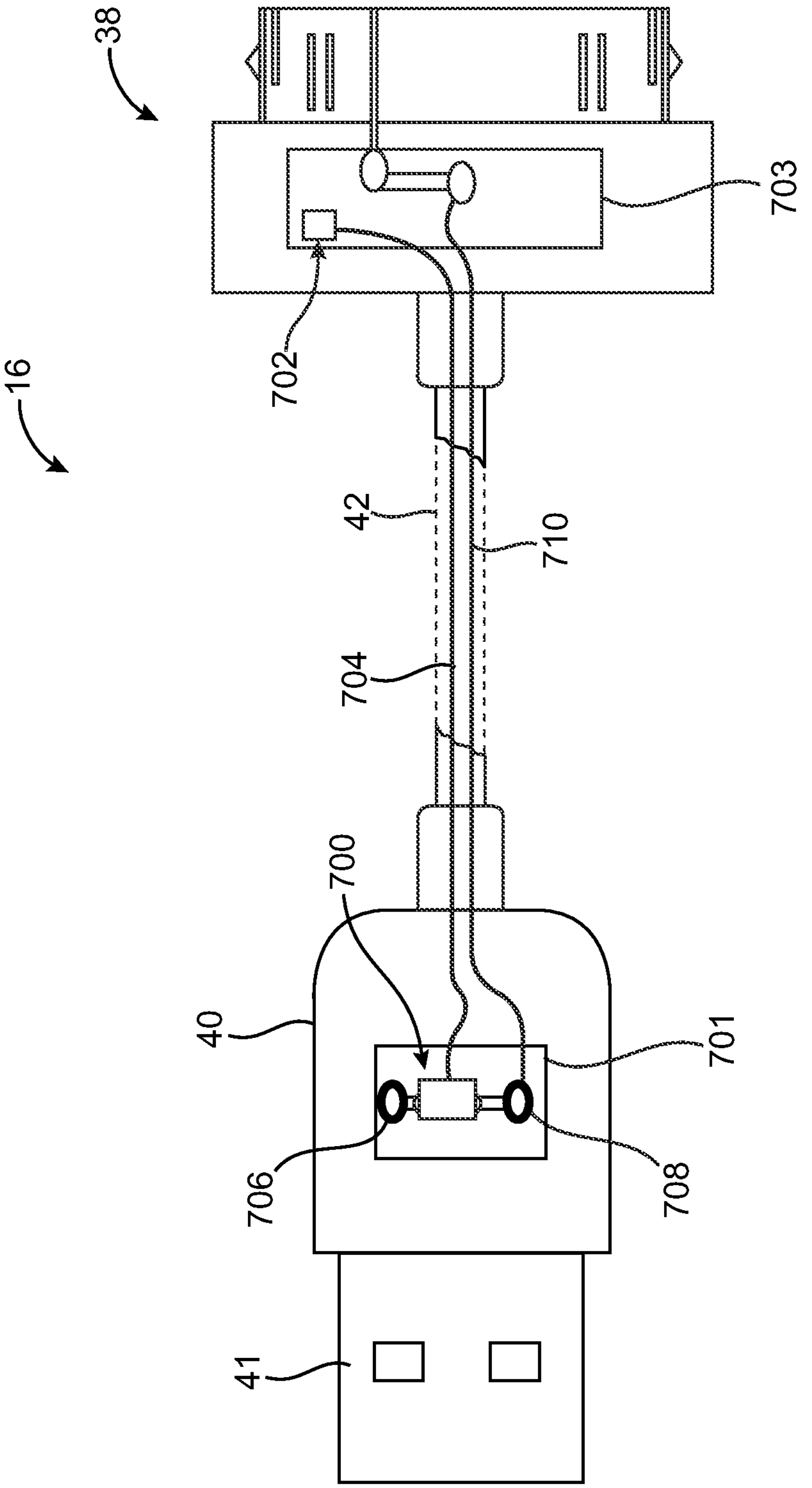
FIG. 7 is a top view of an illustrative cable that may include a first connector with a temperature sensor and a second connector with a power cutoff switch that can deactivate power supply lines to the first connector in response to rising temperatures in the first connector in accordance with an embodiment of the present invention.

An example of thermal protection circuitry that may be used to shut off power to connector 38 is shown in FIG. 7. As shown in FIG. 7, cable 16 may include thermal protection circuitry such as circuit 700 in connector 40 and sensor 702 in connector 38. Circuit 700 may be a power cutoff switch and circuit 702 may be a sensor in connector (as examples). Circuitry 702 may include a temperature sensor and may include a liquid sensor.

Thermal protection circuitry such as circuit 700 in connector 40 may be mounted on a printed circuit board such as board 701 and, if desired, may be connected to a sensor 702 in connector 38 over path 704. Sensor 702 may be mounted on a printed circuit board 703 in connector 38. With one suitable arrangement, thermal protection circuit 700 may include a switch coupled between contacts 706 and 708 of printed circuit board 701. As an example, contact 706 may receive a positive power supply voltage from electronic device 14 (e.g., over male connector portion 41 of connector 40). During normal operation, switch 700 may electrically connect contact 706 to contact 708 and conductor 710. In this example, the positive power supply voltage may be conveyed to connector 38 over conductor 710 (e.g., one of a plurality of conductors in path 42).

Switch 700 may receive control signals from sensor 702 over path 704. The control signals may be indicative of the current temperature of connector 38 and may be indicative of the presence of moisture in connector 38. When the temperature of connector 38 exceeds a threshold temperature such as a threshold value less than 85° C., a threshold value of 85° C., a threshold value of 90° C., a threshold value of 95° C., a threshold value of 100° C., a threshold value of greater than 100° C., or any other suitable threshold temperature, sensor 702 may send a control signal to switch 700 directing switch 700 to shut off power by forming an open circuit in one or more power supply lines to connector 38. If desired, when moisture is detected within connector 38 by sensor 702, sensor 702 may send a control signal to switch 700 directing switch 700 to shut off power to connector 38. As an example, switch 700 may isolate contact 706 from contact 708, thereby cutting off power to the conductor 710 that was previously providing power to connector 38. With this type of arrangement, thermal protection circuits 700 and 702 may work together to protect connector 38 from overheating. For example, if a dendritic growth in connector 38 shorts conductor 710 to a ground potential, circuits 700 and 702 can detect rising temperatures resulting from the short and can shut power off to connector 38 (e.g., shut off power to conductor 710).

Figure 8:
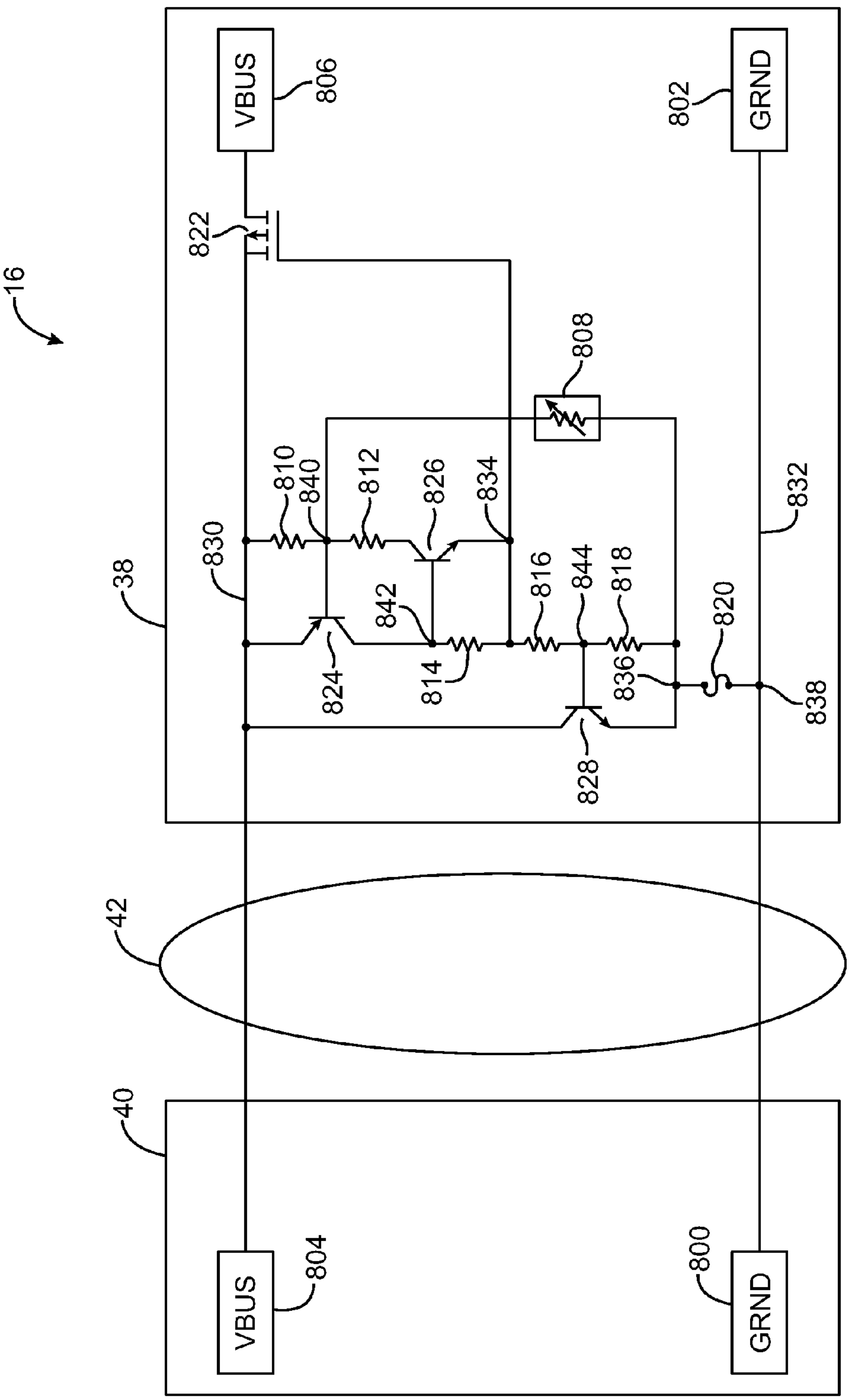
FIG. 8 is a circuit diagram of an illustrative cable having thermal protection circuitry in a connector at one end of the cable in accordance with an embodiment of the present invention.

An illustrative circuit diagram in which thermal protection circuitry is included in connector 38 is shown in FIG. 8. The circuit diagram of FIG. 8 illustrates a potential implementation of the arrangement of FIG. 6. As shown in FIG. 8, cable 16 may convey a ground voltage between ground (GRND) contact 800 of connector 40 and ground (GRND) contact 802 of connector 38. Cable 16 may convey a positive power supply voltage between contact 804 of connector 40 and contact 806 of connector 38 (e.g., the VBUS contacts in connectors 38 and 40).

As shown in the example of FIG. 8, thermal protection circuitry in connector 38 may include a temperature-sensitive resistor such as thermistor 808, resistors such as resistors 810, 812, 814, 816, and 818, a fuse-type resistor such as fuse 820, and transistors such as transistors 822, 824, 826, and 828 (as examples). With one suitable arrangement, transistor 822 may be an enhancement mode p-channel metal-oxide-semiconductor transistor (i.e., a p-channel MOSFET), transistor 824 may be a bipolar pnp transistor, and transistors 826 and 828 may be bipolar npn transistors.

Transistor 822 may sometimes be referred to as a voltage cutoff switch, a cutoff switch, a current cutoff switch, a voltage cutoff transistor, a cutoff transistor, a current cutoff transistor, etc. Transistor 822 may be connected between positive power supply contact 804 in connector 40 and positive power supply contact 806 in connector 38. Transistor 822 may be controlled by signals on node 834 (e.g., signals from node 834 routed to a gate terminal in transistor 822).

Resistors 810, 812, 814, 816, and 818 may have any suitable resistances. As one example, resistors 810, 812, 814, 816, and 818 may have resistances of approximately 2.0 kilo-ohms, 10.0 kilo-ohms, 200.0 ohms, 50.0 ohms, and 1.0 kilo-ohm, respectively.

When fuse 820 is intact, fuse 820 may have a resistance of approximately 400.0 milli-ohms. Fuse 820 may be stable when less than 250.0 milliamps of current is flowing through fuse 820. When the current flowing through fuse 820 surpasses 250.0 milliamps, fuse 820 may become unstable. As one example, fuse 820 may be blown when the current flowing through fuse 820 surpasses a threshold level such as 500.0 milliamps. When fuse 820 is blown (i.e., not intact), fuse 820 will have a nearly infinite resistance and will therefore open the circuit path between node 836 and node 838 (e.g., when blown, fuse 820 will isolate nodes 836 and 838).

Thermistor 808 may be thermally coupled to connector 38 and to printed circuit board 703 of FIG. 7 (as an example). As a result, thermistor 808 may be responsive to the temperature of connector 38. As one example, thermistor 808 may have a negative temperature coefficient (i.e., the resistance of thermistor 808 may decrease as the temperature of thermistor 808 increases). With one suitable arrangement, thermistor 808 may have a resistance of approximately 470.0 kilo-ohms at room temperature (e.g., at approximately 25.0° Celsius). Thermistor 808 may have a resistance that is approximately proportional to the logarithm of the inverse temperature (e.g., a resistance proportional to $\log(\text{Temperature}^{-1})$).

When connector 38 is at or near room temperature (e.g., during normal operations when connector 38 is at approximately 25.0° Celsius), transistor 822 may be turned on and transistors 824, 826, and 828 may be turned off. The voltage on node 840 may be approximately equal to the positive power supply voltage conveyed between contacts 804 and 806. Because transistors 826 and 824 are turned off, the voltage on node 834 may be approximately equal to the ground power supply voltage on node 838. The ground voltage on node 834 may, in turn, turn on p-channel metal-oxide-semiconductor transistor 822 (e.g., electrically connect contact 806 to contact 804).

As connector 38 is heated (e.g., from a short between positive power supply path 830 and ground power supply path 832 or by another heat source), the resistance of thermistor 808 decreases. As the resistance of thermistor 808 decreases, the voltage on node 840 may be pulled low (e.g., the voltage on node 840 may decrease towards the ground voltage on path 832). This reduced voltage on node 840 may be applied to the base terminal of transistor 824 and may turn transistor 824 on. As transistor 824 is turned on, the voltage on node 842 may be pulled up towards the positive power supply voltage on path 830. The raised voltage on node 842 may be applied to the base terminal of transistor 826 and may turn on transistor 826.

As transistors 824 and 826 are turned on, a positive feedback loop may form between that keeps transistors 824 and 826 turned on. Because transistor 824 is now turned on, the current that passes through resistor 816 increases (relative to normal operation). As a result, the voltage on node 844 is raised from the ground voltage of path 832 towards the positive voltage of path 830. The increasing voltage on node 844 is applied to the base of transistor 828 and transistor 828 is turned on. Transistor 828 may sometimes be referred to herein as a shunt transistor (e.g., a transistor that allows current to flow between paths 830 and 832 without passing through transistors 824 and 826 and thermistor 808).

The current from transistors 824 and 826 (e.g., the current flowing through resistors 816 and 818) may combine with the current flowing through the emitter and collector terminals of transistor 828 and thermistor 808 at node 836. This combined current flows through fuse 820 and burns out fuse 820 when the temperature of thermistor 808 and connector 38 exceeds a threshold temperature (e.g., when the resistance of thermistor 808 drops below a threshold level).

After fuse 820 is blown, the gate of transistor 822 can no longer be held low and transistor 822 is turned off. When transistor 822 is turned off, the positive power supply contact 806 in connector 38 is isolated from path 830 and contact 804 in connector 40, effectively cutting off power to contact 806. This type of arrangement may be able to protect connector 38 from thermal damage when a short forms between contacts 802 and 806 (as an example).

Figure 9:
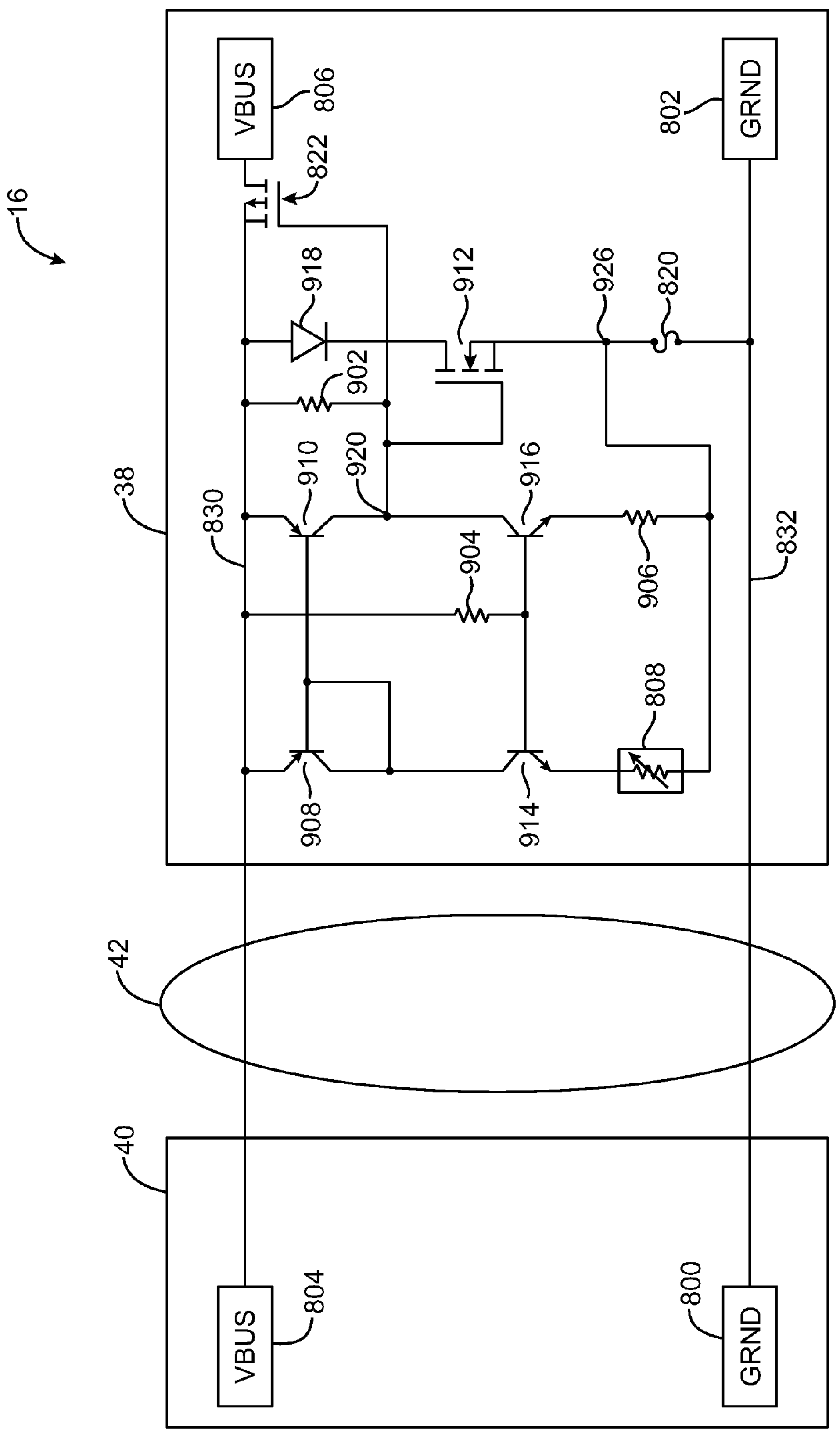
FIG. 9 is a circuit diagram of an illustrative cable having thermal protection circuitry that includes a current mirror and a thermistor in a connector at one of the cable in accordance with an embodiment of the present invention.

Another illustrative circuit diagram in which thermal protection circuitry is included in connector 38 is shown in FIG. 9. As shown in the example of FIG. 9, thermal protection circuitry in connector 38 may include thermistor 808, resistors such as resistors 902, 904, and 906, fuse 820, transistors such as transistors 822, 908, 910, 912, 914, and 916, and diode 918 (as examples). With one suitable arrangement, transistor 912 may be a depletion mode n-channel metal-oxide-semiconductor transistor (i.e., an re-channel MOSFET), transistors 908 and 910 may be bipolar pnp transistors, and transistors 914 and 916 may be bipolar npn transistors.

Resistors 902, 904, and 906 may have any suitable resistances. As one example, resistors 902, 904, and 906 may have resistances of approximately 5.0 mega-ohms, 2.0 mega-ohms, and 2.0 kilo-ohms, respectively.

When connector 38 is at or near room temperature (e.g., during normal operations when connector 38 is at approximately 25.0° Celsius), transistor 822 may be turned on and contact 806 may be electrically coupled to contact 804. During normal operations, transistors 914 and 916 may be turned on by signals passing from path 830 through resistor 904. Transistors 908 and 910 may form a current mirror. Specifically, transistor 910 may be configured to generate a current through its emitter and collector terminals that is approximately equal to the current passing through the emitter and collector terminators in transistor 908. Because the resistance of thermistor 808 is relatively large when connector 38 is at or near room temperature, the current flowing through transistor 908, and therefore the current flowing through transistor 910, may be relatively small. The majority of the current flowing through transistor 910 may also pass through transistor 916 and resistor 906, generating a voltage at node 920 that is just above the ground voltage conveyed on path 832. The voltage on node 920 may turn on transistor 822 and turn off transistor 912, during normal operations.

As connector 38 is heated, the resistance of thermistor 808 decreases. With one arrangement, the thermal protection circuitry in connector 38 may be configured such that, when the temperature of connector 38 reaches a critical temperature, the resistance of transistor 808 matches the resistance of resistor 906. This is merely one example. As the resistance of thermistor 808 decreases, the current flowing through transistors 914 and 908 increases and the increasing current is mirrored by transistor 910. The increased current through transistor 910 causes the voltage on node 920 to rise (e.g., because of the increased current through transistor 906) which, in turn, applies a positive voltage to the gate of transistor 912, thereby turning transistor 912 on. When transistor 912 is turned on, current flows from path 830 through diode 918, transistor 912, and fuse 820 to path 832. This current (combined with the currents through transistors 914 and 916) burns out fuse 820 and electrically isolates node 926 from path 832.

After fuse 820 is blown, the gate of transistor 822 can no longer be held low and transistor 822 is turned off. In particular, current flowing through transistor 902 may charge the gate of transistor 822 to the voltage of path 830 and thereby turn off transistor 822. When transistor 822 is turned off, the positive power supply contact 806 in connector 38 is isolated from path 830 and contact 804 in connector 40, effectively cutting off power to contact 806.

Figure 10:
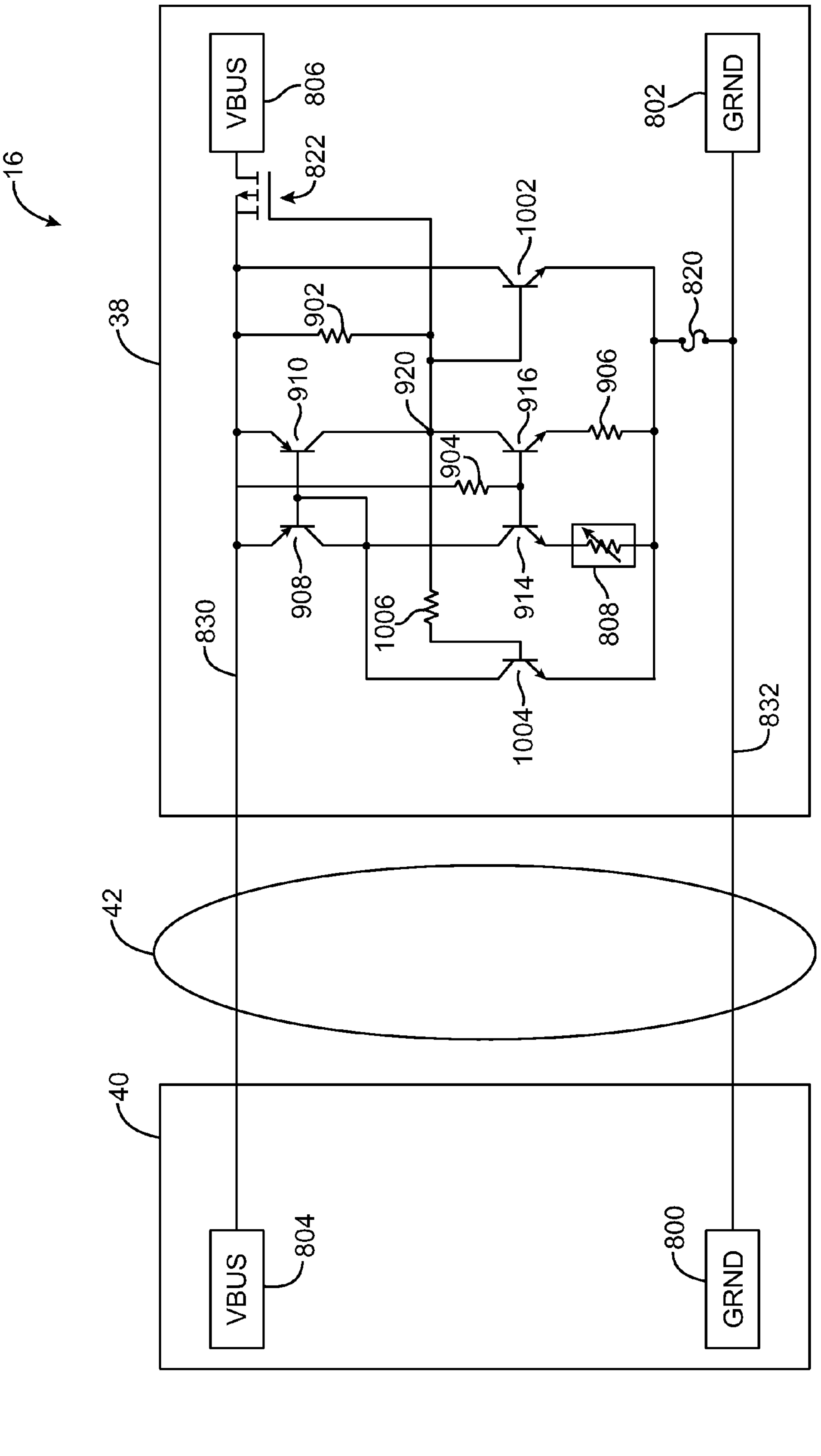
FIG. 10 is a circuit diagram of an illustrative cable having thermal protection circuitry that includes a current mirror, a thermistor, and a positive feedback latching circuit in a connector at one end of the cable in accordance with an embodiment of the present invention.

If desired, thermal protection circuitry may be provided in the form shown in FIG. 10. As shown in FIG. 10, thermal protection circuitry in connector 38 may include a positive feedback circuit with transistor 1004 and resistor 1006. In addition, diode 918 of FIG. 9 may be eliminated and transistor 912 of FIG. 9 may be replaced with a bipolar npn transistor such as transistor 1002. Transistor 1004 may be a bipolar npn transistor, as one example. Resistor 1006 may have any suitable resistance and, as an example, may have a resistance of approximately 10.0 kilo-ohms.

When the temperature of connector 38 increases beyond a critical temperature, the positive feedback circuit may switch on as the connector heats up past the critical temperature, thereby increasing the current through transistor 908. In particular, as the resistance of thermistor 808 decreases and the current through transistor 908 and mirrored transistor 910 increase, the voltage on node 920 increases and turns on transistor 1004. When transistor 1004 is turned on, the current flowing through transistors 908 and 910 and the voltage on node 920 rises even more. This type of arrangement creates a latching scenario in which once the resistance of thermistor 808 drops below a critical value, transistor 1004 is turned on until fuse 820 blows. The increased voltage on node 920 is applied to the base terminal of transistor 1002, thereby turning transistor 1002 on. The combined currents flowing through transistors 1004, 914, 916, and 1002 may burn out fuse 820. Once fuse 820 is burned out, the gate terminal of transistor 822 is no longer biased towards ground, transistor 822 is turned off, and contact 806 is electrically isolated from contact 804.

Figure 11:
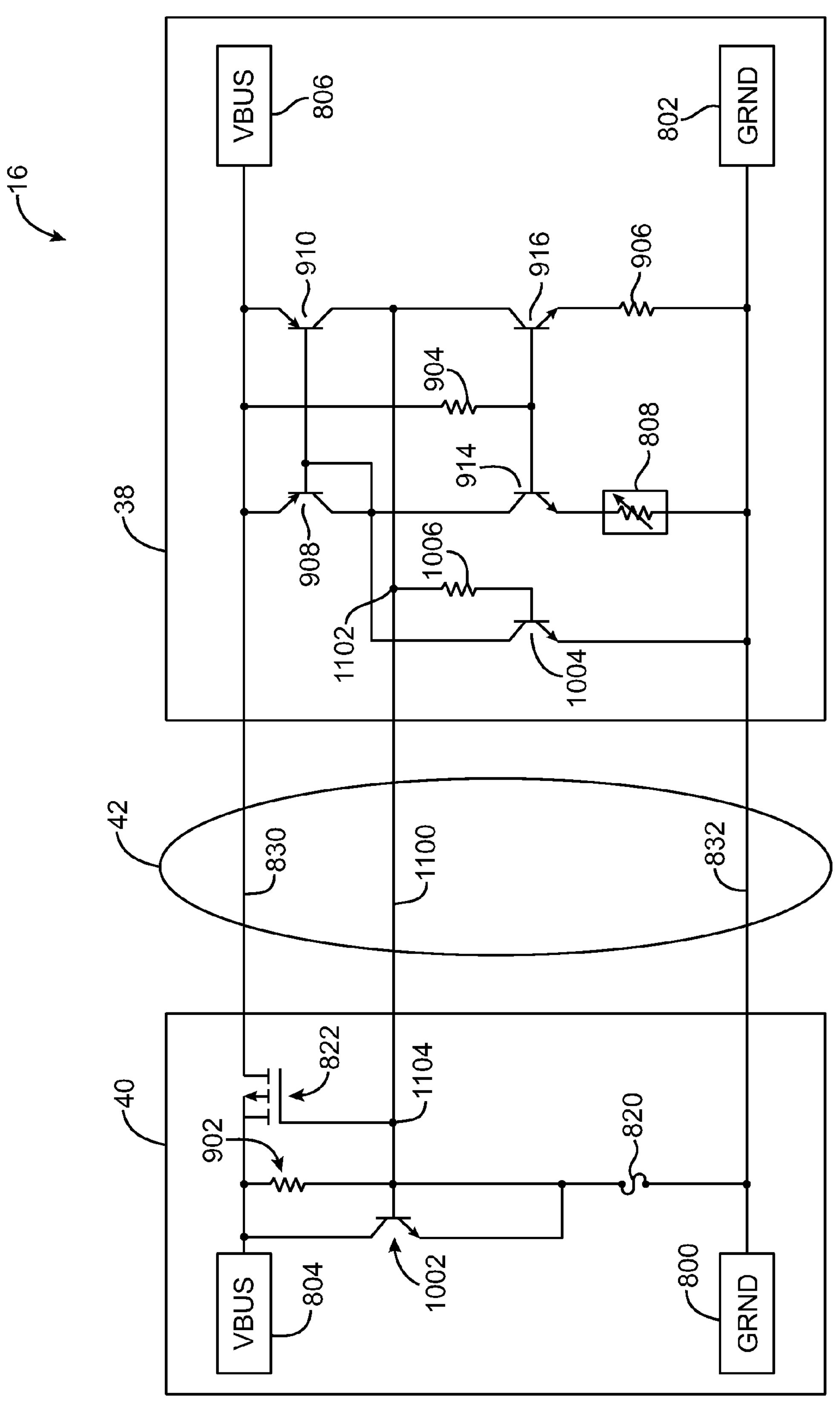
FIG. 11 is a circuit diagram of an illustrative cable having thermal protection circuitry that includes a current mirror, a thermistor, and a positive feedback latching circuit in a first connector in the cable and a power cutoff circuit in a second connector in the cable in accordance with an embodiment of the present invention.

As described in connection with FIG. 7, cable 16 may include thermal protection circuitry in connectors 38 and 40. An example of this type of arrangement is illustrated in the circuit diagram of FIG. 11. As shown in FIG. 11, thermal protection circuitry in cable 16 may include a temperature sensing circuit in connector 38 and power cutoff circuitry in connector 40 that cuts off one or more power supply voltages to connector 38 when the temperature of connector 38 exceeds a critical level. For example, if a short develops in connector 38 and heats connector 38 to a potentially damaging temperature, the thermal protection circuitry in connector 40 may cut off power to connector 38, thereby protecting connector 38 from potential damage.

In contrast to the example of FIG. 10, thermistor 808, resistor 906, and transistor 1004 may be directly connected to path 832 in the example of FIG. 11. Fuse 820, transistors 822 and 1002, and resistor 902 may be moved from connector 38 to connector 40. An additional electrical path in cable 42 such as path 1100 may connect the thermal protection circuits in connectors 38 and 40.

Path 1100 may electrically connect node 1102 together with node 1104. During normal operations (e.g., when the resistance of thermistor 808 is high), the voltage on node 1104 may be at or near a ground voltage and transistor 822 may be turned on, thereby delivering power to path 830 and contact 806. When the resistance of thermistor 808 drops below a critical level in the circuit of FIG. 11, the voltage on node 1104 rises towards the power supply voltage carried on path 830, turns on transistor 1002, and blows out fuse 820. Once fuse 820 is blown, transistor 822 is turned off and contact 804 is electrically isolated from path 830, contact 806, and connector 38. The arrangement of FIG. 11 may help to ensure that power is completely cut off to connector 38, thereby eliminating any potential for an electrical short in connector 38 to damage connector 38 (once transistor 822 is turned off).

Figure 12:
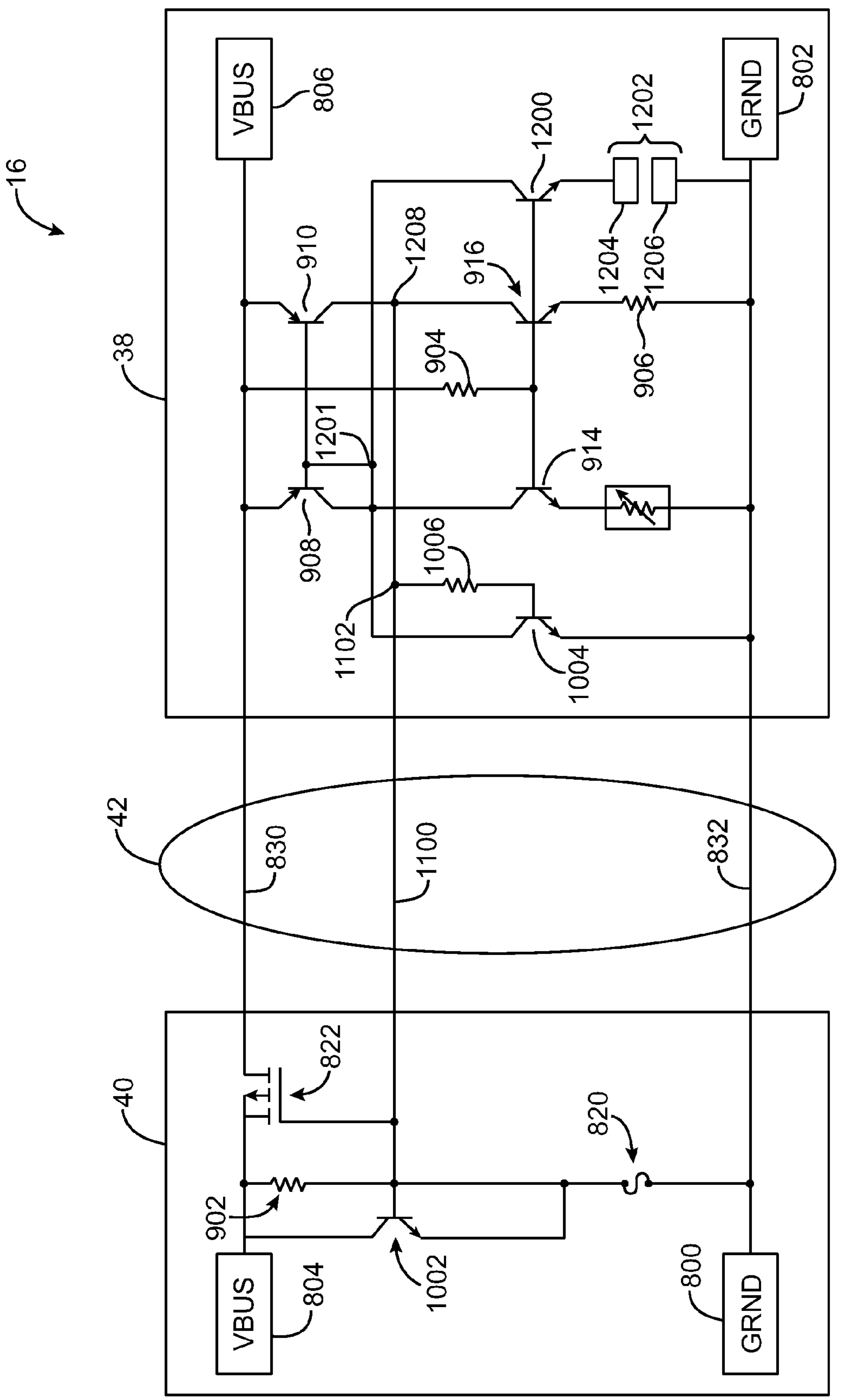
FIG. 12 is a circuit diagram of an illustrative cable having thermal protection circuitry that includes a current mirror, a thermistor, a liquid detection circuit, and a positive feedback latching circuit in a first connector in the cable and a power cutoff circuit in a second connector in the cable in accordance with an embodiment of the present invention.

If desired, circuits of the type shown in FIGS. 8, 9, 10, and 11 may be provided with liquid detection circuitry. An example of how the circuit of FIG. 11 may be provided with liquid detection circuitry is illustrated by FIG. 12. As shown in FIG. 12, the circuitry in connector 38 may include transistor 1200 and liquid detection circuit 1202.

The collector terminal of transistor 1200 (e.g., a bipolar npn transistor) may be electrically connected to node 1201. With this type of arrangement, the combined current flowing through transistors 1004, 1006, and 1200 will be mirrored by transistor 910.

When liquid detection circuit 1202 is exposed to liquid, contacts 1204 and 1206 of circuit 1202 may be shorted together. When contacts 1204 and 1206 are shorted together, current will flow through transistor 1200 to ground path 832. In contrast, when contacts 1204 and 1206 are not shorted together, no current will flow through transistor 1200. The current that flows through transistor 1200, when liquid shorts contacts 1204 and 1206 together, will cause the voltage on node 1208 to rise, thereby turning on latching transistor 1004 and turning on transistor 1002, which in turn blows fuse 820. Once fuse 820 is blown, transistor 822 is turned off and power is no longer delivered to connector 38 over path 830.

The circuits of FIGS. 8, 9, 10, and 11 are merely examples of how thermal protection circuitry may be included in cable 16. When unmodified from the description presented above, each of the circuits may have certain benefits and disadvantages relative to the other circuits.

For example, the circuit of FIG. 8 is the simplest design and includes the smallest number of components (out of FIGS. 8, 9, 10, and 11) but has a relatively high shutdown current (e.g., approximately 23.0 microamperes when the temperature of connector 38 reaches approximately 40° Celsius), has a temperature trip point that is relatively dependent on the voltage of path 830, and the temperature trip point increases as the voltage of path 830 decreases.

The circuit of FIG. 9 has a relatively low shutdown current (e.g., approximately 9.0 microamperes at approximately 40° Celsius), a trip point that is independent of the voltage of path 830, a moderate number of components, and a circuit that turns off pass transistor 912 as fuse 820 is blown, but has no positive feedback (i.e., the circuit is non-latching), includes a metal-oxide-semiconductor pass transistor such as transistor 912 (compared to inexpensive bipolar pass transistor 828), and includes an additional reverse current blocking diode such as diode 918.

The circuit of FIG. 10 includes positive feedback that latches the circuit when a temperature fault is detected. This helps to ensure the circuit stays on long enough to blow fuse 820. The circuit does not include a reverse current blocking diode, but does have a slightly higher component count that the circuit of FIG. 9.

The circuit of FIG. 11 may provide a high level of protection by ensuring that the entire positive power supply path (i.e., path 830) is shut off inside connector 38 (e.g., by shutting off power outside connector 38), but generally requires additional components such as a circuit board in connector 40 and an additional conductor in path 40.

Figure 13:
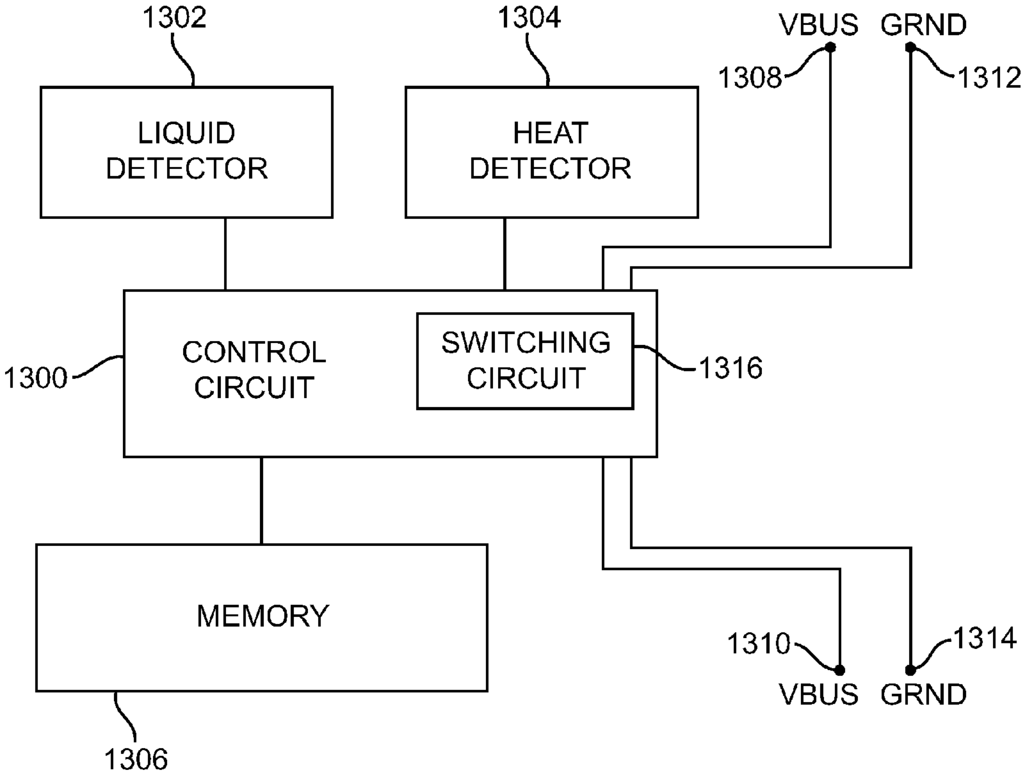
FIG. 13 is a schematic diagram of illustrative thermal protection circuitry in part of a cable that forms a communications path between two electronic devices in accordance with an embodiment of the present invention.

A schematic diagram of thermal protection circuitry that may be provided as a part of a cable such as cable 16 of FIG. 5 is shown in FIG. 13. As shown in FIG. 13, the thermal protection circuitry may include control circuit 1300, memory 1306, and one or more detectors such as liquid detector 1302 and heat detector 1304. Control circuit 1300 may use information obtained from detectors 1302 and 1304 and information stored in memory 1306 in controlling switching circuitry 1316. Switching circuit 1316 may control whether or not power contacts 1308 and 1312 (e.g., power contacts VBUS and GRND in a connector such as connector 40 of FIG. 5) are connected to power contacts 1310 and 1314 (e.g., power contacts VBUS and GRND in a connector such as connector 38 of FIG. 5).

Memory 1306 may include any suitable type of memory. Examples of memory 1306 include single-bit nonvolatile memory circuits such as a fuse and multi-bit nonvolatile memory circuits. If desired, memory 1306 may be implemented using volatile memory circuits.

With one suitable arrangement, control circuit 1300 may use detector 1302 to determine when the temperature of a component such as connector 38 exceeds a threshold level. In response, control circuit 1300 may record information in memory 1306 that indicates that the temperature of the component has exceeded the threshold level and may also send a command to circuit 1316 to electrically isolate contact 1308 from contact 1310 and, if desired, electrically isolate contact 1312 from contact 1314.

Similarly, control circuit 1300 may use detector 1304 to determine when liquid enters a component such as connector 38. In response, control 1300 may record information in memory 1306 that indicates that liquid has entered the connector and may send a command to circuit 1316 to electrically isolate contacts 1308, 1310, 1312, and 1314.

If desired, control circuit 1300 may use memory 1306 in combination with detectors 1302 and 1304 in determining whether or not it is safe to electrically couple contacts 1308, 1310, 1312, and 1314 together. For example, when detector 1304 detects that the temperature of the component exceeds a first threshold level, control circuit 1300 may permanently isolate contacts 1308 and 1310 from contacts 1312 and 1314. In contrast, when detector 1304 detects that the temperature of the component has only exceeded a second lower threshold level, control circuit 1300 may temporarily isolate contacts 1308 and 1310 from contacts 1312 and 1314 (e.g., until the temperature of the connector drops to a safe level or until the circuitry is reset). Similarly, when detector 1302 detects liquid intrusion in the component, control circuit 1300 may temporarily isolate contacts 1308 and 1310 from contacts 1312 and 1314 (e.g., until the liquid intrusion is no longer detected or until the circuitry is reset). These are merely illustrative examples.

Figure 14:
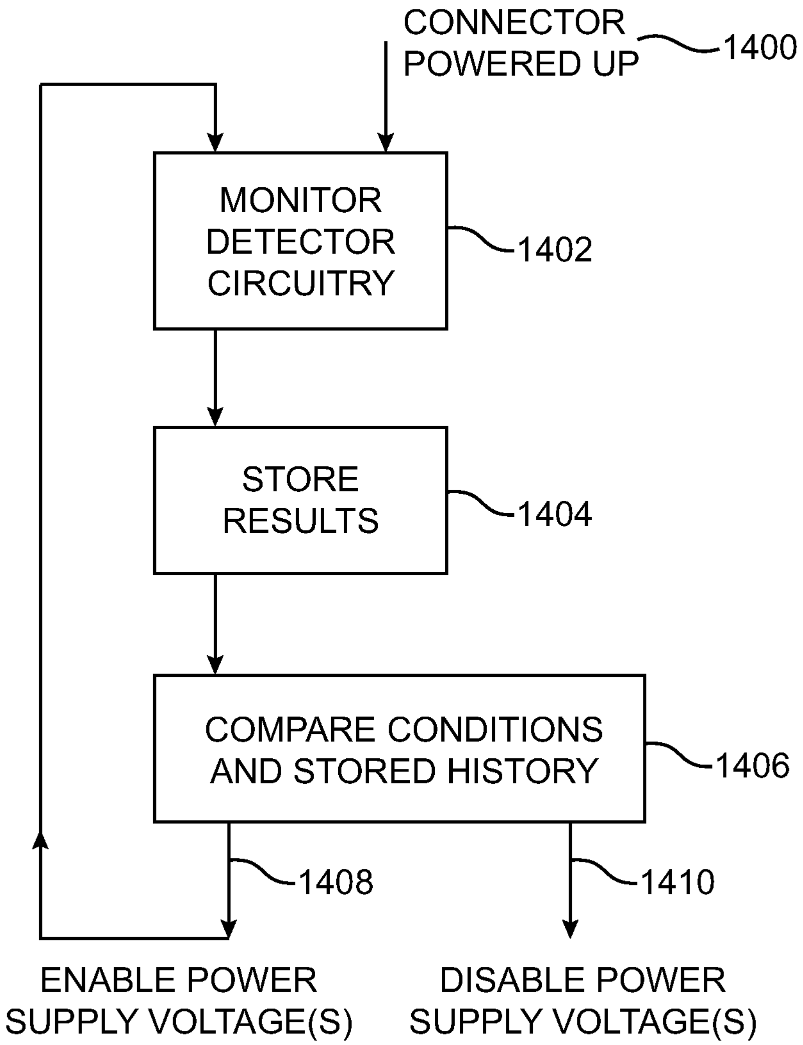
FIG. 14 is a flow chart of illustrative steps involved in using thermal protection circuitry to selectively enable and disable power supply voltages in a cable that may form a communications path between two electronic devices in accordance with an embodiment of the present invention.

FIG. 14 shows illustrative steps that control circuit 1300 of FIG. 13 may use in determining whether or not to enable power (e.g., determining whether contacts 1308 and 1310 are electrically coupled to or isolated from contacts 1312 and 1314).

As shown by line 1400, when cable 16 and control circuit 1300 first receive power (e.g., when connector 40 of FIG. 5 is connected to electronic device 14 of FIG. 1), control circuit 1300 may monitor detector circuitry such as detectors 1302 and 1304 in step 1402.

In step 1404, control circuit 1300 may record results from the detector circuitry. For example, control circuit 1300 may record measurements from detectors 1302 and 1304 in memory 1306. If desired, control circuit 1300 may record multiple measurements from the detectors over time in volatile memory and/or non-volatile memory. For example, control circuit 1300 may blow a fuse when the temperature of connector 38 exceeds a critical level. As another example, control circuit 1300 may store data in volatile memory when liquid is detected in connector 38 (e.g., so that the data is erased when memory 1306 is powered down).

In step 1406, control circuit 1300 may compare current measurements from the detector circuitry and stored results (i.e., the results stored in step 1404). Based on this comparison, control circuit 1300 may either maintain or enable power supply voltages (as illustrated by line 1408) or circuit 1300 may disable power supply voltages (as illustrated by line 1410). With one suitable arrangement, control circuit 1300 may analyze temperature and liquid intrusion patterns over time to determine if power should be cutoff to connector 38. For example, control circuit 1300 may determine when a sudden spike in temperature occurs that may be indicative of a short in connector 38 and, in response, may cut off power to connector 38 even before the temperature of connector 38 exceeds a threshold temperature.

If desired, control circuit 1300 may shut off power to connector 38 until control circuit 1300 is reset (e.g., connector 40 is disconnected and reconnected to device 14). With another suitable arrangement, control circuit 1300 may have to be reset more than once (e.g., 2 times, 5 times, 10 times, etc.) before control circuit 1300 restores power to connector 38.

Figure 15:
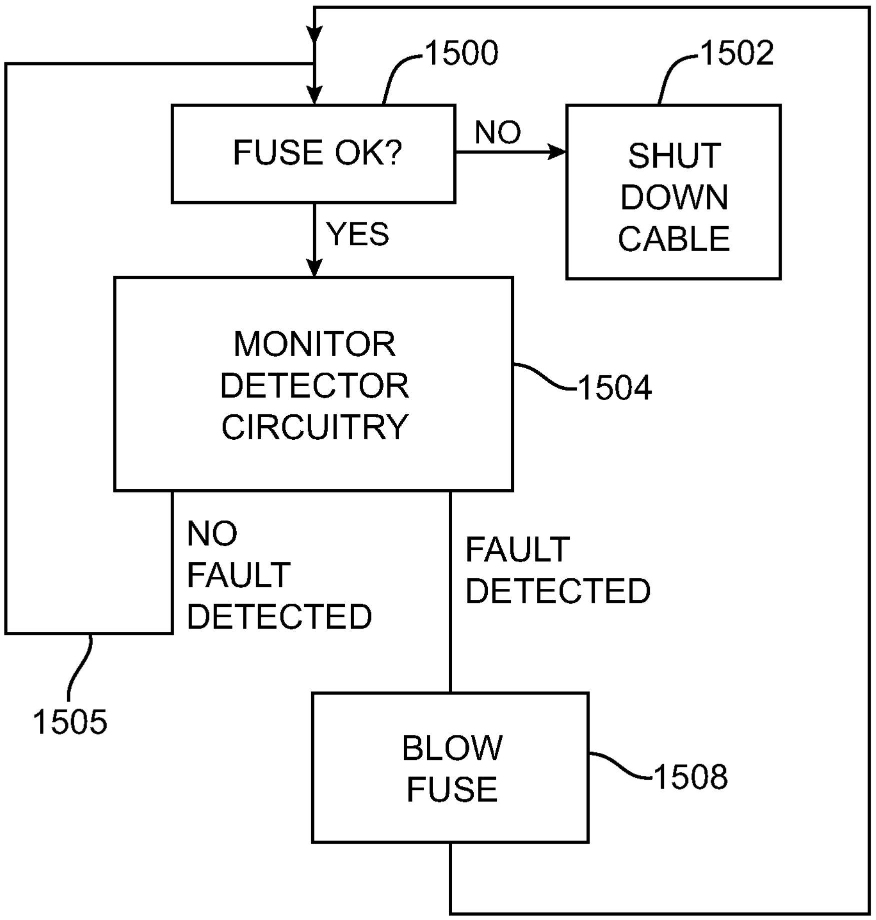
FIG. 15 is a flow chart of illustrative steps involved in using thermal protection circuitry that includes detector circuitry and a fuse that may permanently disable power supply voltages in a cable in response to a fault signal from the detector circuitry in accordance with an embodiment of the present invention.

FIG. 15 shows illustrative steps that control circuit 1300 of FIG. 13 may use in monitoring detector circuitry in connector 38. In the example of FIG. 15, memory 1306 may include a fuse (e.g., non-volatile memory).

When cable 16 is powered up, control circuit 1300 may check the status of the fuse in memory 1306 in step 1500. When the fuse in memory 1306 is blown, control circuit 1300 may shut down cable 16 in step 1502. When the fuse is not blown, control circuit 1300 may continue to step 1504.

In step 1504, control circuit 1300 may monitor detector circuitry in connector 38 such as liquid detector 1302 and heat detector 1304. As illustrated by line 1505, when no faults are detected in connector 38, control circuit 1300 may loop back to check the status of the fuse in step 1500. As illustrated by line 1506, when a fault is detected (e.g., when a short is detected using liquid detector 1302 and/or heat detector 1304), control circuit 1300 may blow the fuse in memory 1306 in step 1508.

Figure 16:
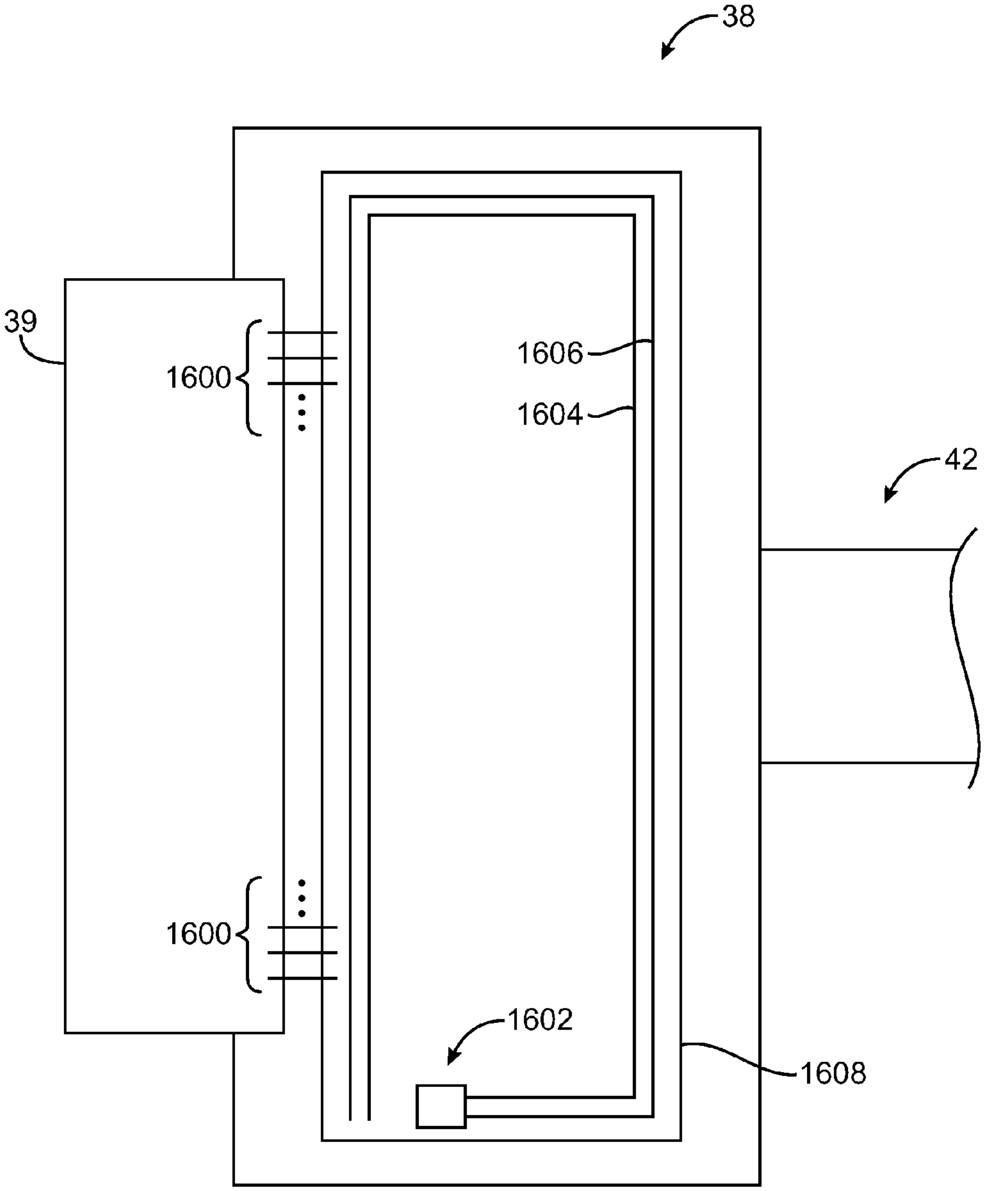
FIG. 16 is a circuit diagram of an illustrative liquid sensor that may be a part of a connector in a cable that forms a communications path between two electronic devices in accordance with an embodiment of the present invention.

As described in connection with FIG. 12, thermal protection circuitry in connector 38 may include one or more liquid detection circuits. An example of a liquid detection circuit that may be included in connector 38 is shown in FIG. 16. As shown in FIG. 16, connector 38 may include a circuit board such as circuit board 1608 with a plurality of conductive pins 1600 connecting to portion 39 (e.g., a male connector portion extending from connector 38). A liquid detector such as detector 1602 may be mounted on circuit board 1608. Detector 1602 (e.g., liquid detection circuit 1202 shown in FIG. 12) may include a pair of parallel wires such as wires 1604 and 1606 (e.g., contacts 1204 and 1204 in the FIG. 12 example). Wires 1604 and 1606 may be placed along the perimeter of circuit board 1608 (as illustrated in FIG. 16). If desired, wires 1604 and 1606 may be placed in areas where liquid instruction is most likely to occur such as adjacent to pins 1601. Detector 1602 may detect the presence of liquid in connector 38 when liquid shorts together wires 1604 and 1606 at a given point along the length of wires 1604 and 1606 (e.g., when liquid electrically bridges the relatively small gap between parallel wires 1604 and 1606).

The foregoing is merely illustrative of the principles of this invention and various modifications can be made by those skilled in the art without departing from the scope and spirit of the invention.

What is claimed is:

1. A cable, comprising:
- at least a pair of conductive lines;
- first and second connectors coupled to respective ends of the lines; and
- thermal protection circuitry that includes:
  - a cutoff switch interposed in at least one of the lines;
  - a fuse, wherein the thermal protection circuitry is configured to close the switch when the fuse is intact; and
- a thermistor configured to blow the fuse through increased current flow in the fuse when temperature of the thermistor has exceeded a threshold temperature.

2. The cable defined in claim 1 further comprising at least one sensor that takes readings.

3. The cable defined in claim 1 wherein the thermistor is located in the first connector and wherein the cutoff switch is located in the second connector.

4. The cable defined in claim 1 further comprising a moisture sensor in the first connector, wherein the thermal protection circuitry is configured to blow the fuse when the moisture sensor detects moisture in the first connector.

5. The cable defined in claim 1 further comprising a moisture sensor in the first connector that includes a pair of conductors separated by a gap, wherein the thermal protection circuitry is configured to blow the fuse when moisture in the first connector electrically couples the pair of conductors together across the gap.

6. The cable defined in claim 1 wherein the thermal protection circuitry further includes a positive feedback that latches the thermal protection circuit when the temperature of the thermistor has exceeded the threshold temperature.

7. The cable defined in claim 3 further comprising a third conductive line, wherein the first and second connectors are coupled to respective ends of the third conductive line.

8. The cable defined in claim 1 wherein the thermistor comprises a thermistor having a negative temperature coefficient.

9. The cable defined in claim 1 further comprising a moisture sensor in the first connector and a temperature sensor in the first connector, wherein the thermal protection circuitry is configured to blow the fuse when the moisture sensor detects moisture in the first connector and wherein the thermal protection circuitry is configured to blow the fuse when the temperature sensor detects that the temperature of the first connector has exceeded a threshold temperature.

10. A cable, comprising:

at least a pair of conductive lines;

first and second connectors coupled to respective ends of the lines;

a cutoff switch interposed in at least one of the lines;

moisture sensor circuitry coupled to the cutoff switch and configured to monitor moisture intrusion into a component of the cable;

heat detector configured to monitor temperature of the component of the cable; and control circuit configured to use moisture intrusion data from the moisture sensor circuitry and temperature data from the heat detector to determine whether the cutoff switch is to be permanently or temporarily opened, wherein the first and second connectors are electrically decoupled when the cutoff switch is opened.

11. The cable defined in claim 10 wherein the moisture sensor circuitry comprises a pair of conductors separated by a gap.

12. A cable, comprising:

at least a pair of conductive lines;

first and second connectors coupled to respective ends of the lines;

a cutoff switch interposed in at least one of the lines;

moisture sensor circuitry coupled to the cutoff switch, wherein the moisture sensor circuitry comprises a pair of conductors separated by a gap; and a printed circuit board in the first connector, wherein the printed circuit board has a perimeter and wherein the pair of conductors are formed on at least part of the perimeter of the printed circuit board.

13. A cable, comprising:

at least a pair of conductive lines;

first and second connectors coupled to respective ends of the lines;

a cutoff switch interposed in at least one of the lines;

moisture sensor circuitry coupled to the cutoff switch, wherein the moisture sensor circuitry comprises a pair of conductors separated by a gap; and a printed circuit board in the first connector, wherein the printed circuit board has a perimeter and wherein the pair of conductors are arranged in a ring that extends around a majority of the perimeter of the printed circuit board.

14. The cable defined in claim 11 further comprising a fuse, wherein the fuse, the cutoff switch, and the moisture sensor circuitry are part of a thermal protection circuitry, wherein the thermal protection circuitry is configured to close the switch when the fuse is intact, and wherein the thermal protection circuitry is configured to blow the fuse when moisture electrically couples the pair of conductors together across the gap and the control circuit has determined the cutoff switch is to be permanently opened.

15. The cable defined in claim 11, wherein the control circuit determines the cutoff switch is to be permanently opened when the moisture sensor circuitry has detected moisture intrusion into the component and the heat detector has detected the temperature of the component to exceed a first threshold level, and wherein the control circuit determines the cutoff switch is to be temporarily opened when the moisture sensor circuitry has detected moisture intrusion into the component and the heat detector has detected the temperature of the component to exceed a second threshold level that is lower than the first threshold level.

16. The cable defined in claim 11 wherein the heat detector comprises a thermistor.

17. A method, comprising:

gathering real time sensor data with sensor circuitry in a cable that has at least a pair of lines with connectors at either end;

retrieving information from storage indicative of previously stored sensor data; and determining to permanently or temporarily prevent power flow through at least one of the lines based at least partly on the retrieved information and at least partly on the real time sensor data.

18. The method defined in claim 17 wherein gathering the real time sensor data with the sensor circuitry comprises gathering sensor data with a moisture sensor.

19. The method defined in claim 17 wherein gathering the real time sensor data with the sensor circuitry comprises gathering real time temperature data with a thermistor and wherein the storage comprises a fuse, the method further comprising:

blowing the fuse in response to temperature data from the thermistor that indicates that the temperature of one of the connectors has exceeded a threshold temperature.

20. The method defined in claim 17 wherein gathering the real time sensor data with the sensor circuitry comprises gathering real time moisture data with a moisture sensor and gathering real time temperature data with a thermistor, wherein the storage comprises at least first and second fuses, the method further comprising:

blowing the first fuse in response to real time temperature data from the thermistor that indicates that the temperature of one of the connectors has exceeded a threshold temperature; and blowing the second fuse in response to real time moisture data from the moisture sensor that indicates that moisture has infiltrated one of the connectors.

* * * * *